United States Patent [19]

Sato et al.

[11] Patent Number: 4,656,121
[45] Date of Patent: Apr. 7, 1987

[54] OPTICAL INFORMATION RECORDING MEDIUM

[75] Inventors: Tsutomu Sato; Masaakira Umehara; Michiharu Abe; Hideaki Oba; Yutaka Ueda, all of Yokohama, Japan

[73] Assignee: Ricoh Co., Ltd., Tokyo, Japan

[21] Appl. No.: 698,701

[22] Filed: Feb. 6, 1985

[30] Foreign Application Priority Data

Feb. 6, 1984 [JP] Japan .................................. 59-18222
May 10, 1984 [JP] Japan .................................. 59-91922

[51] Int. Cl.$^4$ ........................... G03C 1/72; G11B 7/24
[52] U.S. Cl. ................................. 430/495; 430/270; 430/271; 430/346; 430/348; 430/577; 430/584; 430/617; 430/945; 428/913; 346/766; 346/135.1; 556/64
[58] Field of Search ............... 430/945, 346, 270, 348, 430/271, 495, 577, 584, 617; 428/913; 346/135.1, 76 L; 556/64

[56] References Cited

U.S. PATENT DOCUMENTS

| | | | |
|---|---|---|---|
| 3,440,257 | 4/1969 | Susi et al. | 556/64 |
| 3,484,467 | 12/1969 | Susi et al. | 556/64 |
| 3,953,216 | 4/1976 | Hirata et al. | 430/577 |
| 4,415,650 | 11/1983 | Kido et al. | 430/945 |
| 4,460,665 | 7/1984 | Kunikane et al. | 346/135.1 |
| 4,508,811 | 4/1985 | Gravesteijn et al. | 430/495 |
| 4,546,075 | 10/1985 | Kitaguchi et al. | 430/617 |
| 4,551,413 | 12/1985 | Bell | 430/945 |
| 4,600,625 | 7/1986 | Abe et al. | 430/495 |

FOREIGN PATENT DOCUMENTS

| | | | |
|---|---|---|---|
| 57-21458 | 2/1982 | Japan | 428/913 |
| 59-24692 | 2/1984 | Japan | 428/913 |
| 59-67092 | 4/1984 | Japan | 428/913 |

*Primary Examiner*—Charles L. Bowers, Jr.
*Attorney, Agent, or Firm*—Flynn, Thiel, Boutell & Tanis

[57] ABSTRACT

This invention relates to an optical information recording medium having an organic thin film recording layer, and optionally having an underlayer and/or protective layer, characterized in that at least one of said recording layer, underlayer and protective layer contains a compound expressed by the general formula (1),

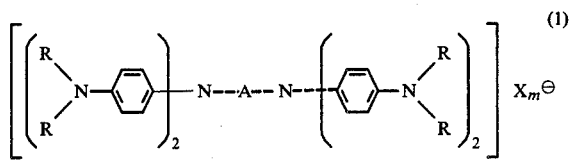

wherein R represents hydrogen or a lower alkyl group; X represents acid anion; m represents 0, 1 or 2; and A represents

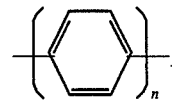

(n being 1 or 2) or

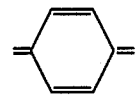

(when m is 2); all the aromatic rings optionally having a substituent selected from the group of a lower alkyl group, lower alkoxy group, halogen and hydroxyl group.

18 Claims, 4 Drawing Figures

OPTICAL INFORMATION RECORDING MEDIUM

BACKGROUND OF THE INVENTION

This invention relates to an optical information recording medium suitable for recording by laser, which is improved in light stability and durability for reading for many times.

Heretofore, there is known an optical information recording and regenerating apparatus which carries out recording and regenerating information by irradiating laser light to a rotating disk-like information recording medium. It is known that an optical information recording medium used in this conventional optical information recording and regenerating apparatus comprises a substrate, metallic reflection film and semi-transparent colored layer containing coloring matter. This recording medium is prepared in such a manner as to satisfactorily detect reflection light reflected from the metallic reflection film when laser light is irradiated through the semi-transparent colored layer containing coloring matter and reaches to the metallic reflection film. This metallic reflection film is provided to supply reflection light amount since an amount of light obtained by the colored layer only is insufficient.

However, the presence of the metallic reflection film makes the structure of an optical information medium complicated and leads to a high production cost. Accordingly, it is proposed to remove the above defect by using a single layer film comprising an organic coloring matter only having a highly reflective bronze gloss. For example, Japanese Patent Laid Open No. 58-112790 discloses that a light absorbing reflection film suitable for recording and reflection regenerating by laser can be obtained by using a cyanine coloring matter of large light absorbing properties as a recording layer, which has a film thickness of 300 Å°–600 Å° and a metallic gloss (reflectivity=20–30%); and also that there is a merit that an apparatus can be made a small size by using a semi-conductor laser of 750–850 nm as a laser light source. However, this organic coloring matter generally has disadvantages that it is unstable to light and heat and that its preservation stability is poor since it is easily oxidized. Thus, a satisfactory organic thin film suitable for a recording layer has not been developed up to now.

SUMMARY OF THE INVENTION

An object of the present invention is to provide an optical information recording medium having excellent properties stable to heat and regeneration light and also having a high sensitivity.

Particularly, an object of the present invention is to improve preservability (stability to light irradiation) of an organic coloring matter-containing recording layer, thus providing an optical information recording medium having a high recording density and C/N ratio and an excellent preservability.

Thus, an object of the present invention is to provide an optical information recording medium having an organic thin film recording layer, and optionally having an underlayer and/or protective layer, characterized in that at least one of said recording layer, underlayer and protective layer contains a compound expressed by the general formula (1), wherein R represents hydrogen or a lower alkyl group; X represents acid anion; m represents 0, 1 or 2; and A represents (n being 1 or 2) or (when m is 2); all the aromatic rings optionally having a substituent selected from the group of a lower alkyl group, lower alkoxy group, halogen and hydroxyl group.

DETAILED DESCRIPTION OF THE INVENTION

The present invention is based on the discovery that the compound of the general formula (1) per se is useful as a stable recording material and that said compound improves the stability of other organic coloring matter recording materials when it is used in combination with them.

The above mentioned object of the present invention can be achieved by incorporating the compound of the general formula (1) with at least one of an organic coloring matter thin film recording layer, an underlayer and a protective layer.

Thus, the object of the present invention can be achieved by providing an optical information recording medium having an organic thin film recording layer, and optionally having an underlayer and/or protective layer, characterized in that at least one of said recording layer, underlayer and protective layer contains a compound expressed by the general formula (1), wherein R represents hydrogen or a lower alkyl group; X represents acid anion; m represents 0, 1 or 2; and A represents

(n being 1 or 2) or when m is 2); all the aromatic rings optionally having a substituent selected from the group of a lower alkyl group, lower alkoxy group, halogen and hydroxyl group.

Examples of acid anions represented by $X^{\ominus}$ in the general formula (1) include halogen ion, hexafluoroarsenic acid ion, hexafluoroantimonic acid ion, fluoroboric acid ion, perchloric acid ion, trifluoroacetic acid ion, periodic acid ion and the like.

Typical examples of the compound of the general formula (1) include Compounds 1 to 44 as listed below, but are not limited thereto.

1

2

3

4

5

6

7

8

9

10

-continued

11

12

13

14

15

16

17

18

19

20

-continued

21

22

23

24

25

26

27

28

29

30

-continued

31

32

33

34

35

36

37

38

39

40

41

-continued

[[(n-C4H9)2N—⟨C6H4⟩—]2N+=⟨C6H4⟩=N+···[—⟨C6H4⟩—N(n-C4H9)2]2](ClO4−)2   42

[[(n-C3H7)2N—⟨C6H4⟩—]2N+=⟨C6H4⟩=N+···[—⟨C6H4⟩—N(n-C3H7)2]2](BF4−)2   43

[[(n-C3H7)2N—⟨C6H4⟩—]2N+=⟨C6H4⟩=N+···[—⟨C6H4⟩—N(n-C3H7)2]2](AsF6−)2   44

The organic thin film of the present invention may contain the compound of the general formula (1) alone as a recording material or may contain a mixture of said compound with other coloring matter, low molecular compound and/or high molecular compound. Typical examples I to XIV of coloring matters and other compounds which can be mixed with the compound of the general formula (1) are listed below, but are not limited thereto.

I. Croconium type coloring matter wherein X represents a chromophoric group; M⊕ represents a cation; Y⊖ represents an anion, but Y⊖ is not present when the chromophoric group contains an anion.

II. Azulene type coloring matter wherein A⊖ represents $R_1$, $R_2$, $R_3$, $R_4$ and $R_5$ represent hydrogen, alkyl group, alkoxy group, or substituted or non-substituted aryl group.

III. Triphenodithiazine compound wherein $R_1$ and $R_2$ may be the same or different, and represent hydrogen, halogen, alkyl group, phenyl group and phenyl group substituted with at least one or more of alkyl group, alkoxy group, carboxyl group, carboxylate group, halogen, hydroxyl group, sulphonic acid group and sulphonate group.

IV. Phenanthrene derivatives

R: alkyl group such as $CH_3$, $C_2H_5$ and the like
X: $BF_4$, $ClO_4$ $R_1$: alkyl group such as $CH_3$, $C_2H_5$ and the like
$R_2$:

X: $BF_4$, $ClO_4$

V. Phthalocyanine type compound wherein M represents hydrogen, vanadium oxide, copper, beryllium, magnesium, calcium, zinc, cadmium, barium, aluminum, tin, lead, vanadium, chromium, manganese, iron, cobalt, nickel, tin halide, aluminum halide and the like. M is preferably hydrogen, lead, nickel, hycobalt, copper, vanadium oxide, aluminum choride and tin chloride. X represents hydrogen and halogens such as chlorine, bromine, iodine and fluorine, and n is an integer of 1 to 16.

VI. Tetradehydrocholine type compound wherein R represents alkyl group, carboalkoxy group such as $COOC_2H_5$ and the like; $R_1$ represents hydrogen, alkyl and the like; and M represents H, Ni(II), Co(II), Co(III) and the like; X represents Br, $ClO_4$ and the like.

VII. Dioxadine compound and its derivatives (a) Condensed ring closure reaction product of aromatic amine with fluoranil, chloranil, bromanil or iodanil A: the residue of substituted or non-substituted aromatic amine
X: —F, —Cl, —Br, —I
(b)

X: —F, —Cl, —Br, —I
R: —H, —$NO_2$, —$NH_2$, —$OCH_3$, —$OC_2H_5$, —F, —Cl, —Br, —I, aromatic group
m, n: 1–4

VIII. Anthraquinone derivatives
Compound having the following structural formula
Structural Formula (I)

wherein $X_1$, $X_2$, $X_3$ and $X_4$ respectively represent hydrogen, alkyl group, hydroxyl group, nitro group, amino group, cyano group and halogen; Y represents hydrogen and sulphonate group; $Ar_1$ represents hydrogen, phenyl group, naphthyl group and their sulphonated products and salts, and said phenyl group may be substituted with alkyl group, alkoxy group, amino group, alkylcarbonyl group, methylthio group, halogen and phenylcarbonyl group; and $Ar_2$ represents hydrogen, phenyl group, and their sulphonated products and salts, and said phenyl group may be substituted with alkyl group, alkoxy group, amino group, alkylcarbonyl group, phenylcarbonyl group and halogen.

Structural Formula (II)

wherein $X_1$, $X_2$, $X_3$ and $X_4$ are the same as above; $X_5$ represents hydrogen and —NH—Ar$_1$; Z represents hydrogen, —NH—Ar$_1$ and —S—Ar$_1$; and Ar$_1$ is the same as above.

Particularly, a compound having an indanthrene structure as expressed by the structural formula (II) is suitable for semi-conductor laser since this compound has absorption peak in the vicinity of a wave length of 800 nm.

Examples of anthraquinone derivatives expressed by the above structural formulas (I) and (II) include
1-amino-4-(4-sulphonic acid phenylamino)-6,7-dinitroanthraquinone sodium salt,
1-anilino-2-sulphonic acid sodium-4-(4-methylphenylamino)anthraquinone,
8,17-bis-(4-methoxyphenylamino)-indanthrene,
1,4-bis(3-sulphonic acid sodium-4-methoxyphenylamino)-6,7-dicyanoanthraquinone,
1,4-bis(3-sulphonic acid sodium-4-chlorophenylamino)-5,8-dichloroanthraquinone,
1-(2-methylphenylamino)-2-sulphonic acid sodium-4-(4-aminophenylamino)-6,7-dinitroanthraquinone,
1,4-bis(3-sulphonic acid sodium-4-anilino-1-anthraquinolylamino)benzene,
1,4-bis(4-(4-sulphonic acid sodium-phenylamino)-1-anthraquinolylamino)benzene and the like.

IX. Xanthene type compound

$R_1$: —OH, =O, —N(R)$_2$ (R=C$_1$-C$_{10}$ alkyl)
$R_2$: =N$^+$(R)$_2$.X$^-$ (X$^-$=acid anion, R=C$_1$-C$_{10}$ alkyl)
$R_3$: H, C$_1$-C$_{20}$ alkyl, SO$_3$Na, SO$_3$H, SO$_2$N(R)$_2$ (R=C$_1$-C$_{10}$ alkyl), COOH, COONa, COOK X. Triphenyl methane type compound

$R_1$: H, —N(R)$_2$ (R=C$_1$-C$_{10}$ alkyl), C$_1$-C$_{20}$ alkyl, —OH
$R_2$: H, —N(R)$_2$ (R=C$_1$-C$_{10}$ alkyl), C$_1$-C$_{20}$ alkyl, —OH
$R_3$: H, C$_1$-C$_{20}$ alkyl; halogen, SO$_3$H, —N(R)$_2$ (R=C$_1$-C$_{10}$ alkyl)
X$^\ominus$: acid anion XI. Squarylium type dye wherein X represents a chromophoric group. Typical examples include as follows:

(a) R$_1$ = CH$_3$, R$_2$ = R$_3$ = H, Z = S
(b) R$_1$ = R$_z$ = CH$_3$, R$_3$ = H, Z = Se
(c) R$_1$ = C$_2$H$_5$, R$_z$ = CH$_3$, R$_3$ = H, Z = Se

(a) R$_1$ = CH$_3$
(b) R$_1$ = C$_2$H$_5$

-continued (a) $R_1 = CH_3$
(b) $R_1 = C_2H_5$

XII. Polymethine type compound having a polymethine chain
(a) Pyrylium type compound wherein $X_1$ and $X_2$ represent sulphur atom, oxygen atom or selenium atom;

$Z_1$ represents a hydrocarbonyl group comprising atomic groups necessary for composing pyrylium, thiopyrylium, selenapyrylium, benzopyrylium, benzothiopyrylium, benzoselenapyrylium, naphthopyrylium, naphthothiopyrylium or naphthoselenapyrylium which may be substituted or non-substituted;

$Z_2$ represents a hydrocarbonyl group comprising atomic groups necessary for composing pyran, thiopyran, selenapyran, benzopyran, benzothiopyran, benzoselenapyran, naphthopyran, naphthothiopyran or naphthoselenapyran;

$R_1$, $R_2$, $R_3$ and $R_4$ represent hydrogen atom, substituted or non-substituted alkyl group, or substituted or non-substituted aryl group;

$R_5$, $R_6$ and $R_7$ represent hydrogen atom, halogen atom, substituted or non-substituted alkyl, substituted or non-substituted aryl, or substituted or non-substituted aralkyl;

m and l represent 1 or 2; and
n represents 0, 1 or 2.

(b) Cyanine coloring matter and merocyanine coloring matter wherein

$R_1$ and $R_2$ may be the same or different and represent alkyl, hydroxyalkyl, alkoxyalkyl, aralkyl, carboxyalkyl, carboxyalkylate bonded with an alkaline metal cation, sulphoalkyl, or sulphonate alkyl bonded with alkaline metal cation or sulphoalkyl;

$Z_1$ and $Z_2$ represent 5 membered or 6 membered heterocyclic rings or atomic groups capable for composing a condensed ring comprising 5 membered or 6 membered heterocyclic rings;

l represents an integer of 1 to 4; and
X represents an acid anion.

Examples of these heterocyclic rings include indole type, thiazole type, oxazole type, pyrrole type and the like.

(c)

and/or wherein A, B, D and E represent a substituted or non-substituted aryl group; $R_1$ to $R_8$ may be the same or different, and represent hydrogen atom, halogen atom or an alkyl group; Y represents a divalent residue having atomic group necessary for composing 5 membered or 6 membered ring; m, n and l represent 0, 1 or 2; and $X^\ominus$ represents acid anion.

(d) Croconium type coloring matter bonded with polymethine chain.

(e) Azulene type coloring matter bonded with polymethine chain.

Typical examples of polymethine type compounds are listed above, but it should be understood that other polymethine type compounds which can not be expressed by the above chemical formulas can also be used in the present invention.

Among the above mentioned compounds I to XII, polymethine type compound (XII) is suitable for mixing with the compound having the general formula (1) of the present invention. Particularly, among the polymethine type compounds (XII), cyanine coloring matter is most preferable for mixing with the compound of the general formula (1).

The following compounds XIII and XIV are optionally used depending on use.

XIII. Low molecular compound

Plasticizer, surfactant, antistatic agent, slip additive, fire retardant, stabilizer, dispersing agent, antioxidant, light resistance improver and the like.

XIV. High molecular compound

Ionomer resin, polyamide resin, vinyl type resin, natural high molecular compound, silicone, liquid rubber, silane coupler and the like.

The structure of the optical information recording medium of the present invention is further illustrated in accordance with the drawings.

Figure 1:
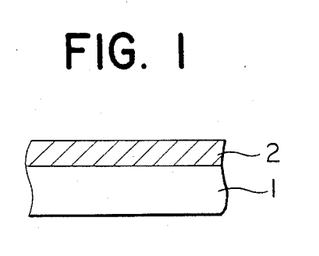
FIGS. 1 to 4 are cross-sectional views illustrating various types of structures of the optical information recording medium of the present invention.

As can be seen in FIG. 1, the optical information recording medium of the present invention is basically composed of an organic thin film recording layer 2 containing the compound of the above general formula (1) applied on a substrate 1. The recording layer may be composed of a combination of two layers of a light-reflecting layer and a light-absorbing layer in any order. The recording layer can be formed by any conventional process such as vapor depositing, sputtering, CVD, solution coating and the like. The solution coating is carried out by dissolving said compound in an organic solvent such as dichloroethane and subjecting the solution by any conventional method such as spraying, roller coating, dipping, spinning and the like. The recording layer has a thickness of 100 Å to 5 μm, preferably 200 Å to 2 μm.

A substrate 1 should be transparent to laser light used when recording is carried out from the substrate side, but it is not necessary to be transparent when the recording is carried out from the recording layer side. Examples of the substrate generally include glass, polycarbonate, polymethylmethacrylate and the like, but any other conventional material suitable for a recording medium can also be used.

Figure 2:
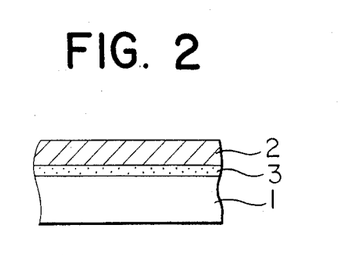
Figure 3:
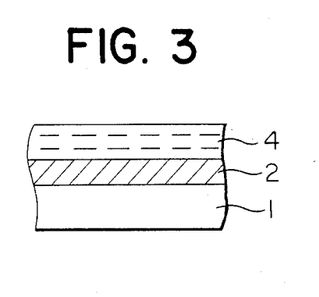
Figure 4:
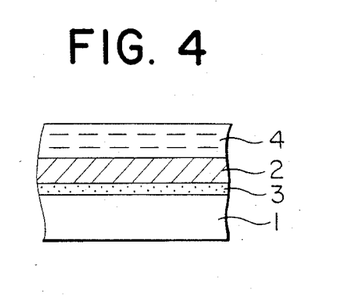

As can be seen from FIGS. 2 to 4, the recording medium may further comprise an under layer 3 and/or a protective layer 4.

The object of the present invention can be achieved by incorporating the compound of general formula (1) with at least one of the recording layer 2, under layer 3 and protective layer 4. The recording layer itself may contain or may not contain said compound.

The compound of said general formula (1) is added to the recording layer in an amount of 2 to 60% by weight, preferably 5 to 40% by weight on the basis of the total solid content. An amount of said compound added to the under layer or protective layer is 2 to 90% by weight, preferably 10 to 50% by weight.

The under layer 3 is used for the purposes of (a) improving adhesion, (b) using as a barrier for water, gas and the like, (c) improving preservation stability of the recording layer and (d) improving reflectivity. For the purpose of (a), various high molecular materials can be used, for example, ionomer resin, polyamide resin, vinyl type resin, natural high molecular compound, silicone, liquid rubber and the like. For the purpose of (b), in addition to said high molecular materials, various inorganic compounds can be used, for example, SiO₂, MgF₂, SiO, TiO₂, ZnO₂ and the like, metallic or half-metallic layers such as Zn, Cu, S, Ni, Cr, Ge, Se, Cd, Ag, Al and the like. For the purpose of (c), materials usable for the purposes of (a) and (b) can be used. For the purpose of (d), metals such as Ag, Al and the like can be used. The under layer has a thickness of 0.1 to 30 μm, preferably 0.2 to 10 μm.

The protective layer 4 is provided for the purposes of protecting a recording layer from damages, dusts, dirts and the like and of improving the chemical stability of the recording layer. The same materials as used for the under layer can also be used for these purposes. The protective layer has a thickness more than 0.1 μm, preferably more than 50 μm.

Other structures of the optical information recording medium of the present invention may comprise two sheets of the recording mediums (one of the two substrates may be omitted if desired) as illustrated in FIGS. 1 to 4. The two sheets are combined by disposing the organic thin film recording layers 2 inside and sealing air therebetween, thus forming so called an air-sandwich structure. Or the two sheets are closely adhered each other by intervening the protective layer 4 therebetween, thus forming a close contact sandwitch structure (laminated structure).

A device can be made smaller if a semi-conductor laser having a wavelength of 750–850 nm is used as a laser light source.

DESCRIPTION OF THE PREFERRED EMBODIMENTS

The present invention is further illustrated by the following Examples, but is not limited thereto.

EXAMPLE 1

A recording medium was prepared by spin-coating a methyl ethyl ketone solution of the above listed Compound 11 on a polymethylmethacrylate substrate having a thickness of 1.2 mm, thus forming a recording layer of a thickness of 1.2 μm.

EXAMPLE 2

A recording medium was prepared by vapor-depositing silver on the recording layer prepared in the above Example 1, thus forming a silver vapor deposition film of a thickness of 150 Å on the recording layer of Example 1.

EXAMPLE 3

A recording medium was prepared by spin-coating a 1,2-dichloroethane solution containing a mixture of the above listed Compound 5 and the compound having the following chemical formula (I) in a weight ratio of 1 to 1 on a polymethylmethacrylate substrate having a thickness of 1.2 mm, thus forming a recording layer of a thickness of 700 Å.

EXAMPLE 4

A recording medium was prepared by spin-coating a methyl ethyl ketone solution containing a mixture of the above listed Compound 2 and the compound of the following chemical formula (II) in a weight ratio of 6 to 4 to form a layer of a thickness of 600 Å on a polymethylmethacrylate substrate having a thickness of 1.2 mm and further vapor-depositing thereon the compound of the following chemical formula (III) to a thickness of 150 Å, thus forming a recording layer.

EXAMPLE 5

A recording medium was prepared by vapor-depositing the compound of the chemical formula (III) used in the above Example 4 to a thickness of 100 Å on a polymethylmethacrylate substrate of a thickness of 1.2 mm and further spin-coating thereon a methanol solution of the above listed Compound 10 to form a recording layer having a thickness of 600 Å in total.

EXAMPLE 6

A recording medium was prepared by repeating the same procedure as in Example 2, except that the above listed Compound 8 was used.

The recording mediums prepared in the above Examples 1 to 6 were subjected to writing and regenerating tests by irradiating a semi-conductor laser light of a wave length of 833 nm through the substrate side at a recording frequency of 0.5 MHz and linear velocity of 1.5 m/sec and spectrum analysis (scanning filter, band width 30 KHz) was carried out to measure initial reflectivity and C/N. The same recording medium were irradiated with tungsten light of 54,000 lux for 50 hours, and reflectivity and C/N values were then measured. The results are shown in the following table 1.

TABLE 1

| | Initial Properties | | | After Light Irradiation for 50 Hours | | |
|---|---|---|---|---|---|---|
| Example | Writing Power (mW) | Reflectivity (%) | C/N (dB) | Writing Power (mW) | Reflectivity (%) | C/N (dB) |
| 1 | 4.3 | 14.8 | 46 | 4.6 | 14.1 | 41 |
| 2 | 5.0 | 32.2 | 51 | 5.2 | 31.9 | 43 |
| 3 | 3.3 | 25.5 | 52 | 3.5 | 20.9 | 46 |
| 4 | 3.3 | 27.6 | 56 | 3.5 | 22.8 | 46 |
| 5 | 4.0 | 24.9 | 55 | 4.0 | 21.1 | 45 |
| 6 | 5.0 | 31.8 | 52 | 5.2 | 30.4 | 44 |

EXAMPLE 7

A recording medium was prepared by spin-coating a 1,2-dichloroethane solution containing a coloring matter having the following chemical formula and the above listed Compound 1 in a weight ratio of 100:15 on a polymethylmethacrylate substrate to form a recording layer having a thickness of about 500 Å.

The recording medium thus prepared was subjected to recording and regenerating tests by irradiating a semi-conductor laser light of a wave length of 790 nm through the substrate side at a recording frequency of 0.6875 MHz and a pit length of 0.9 μm, and spectrum analysis (scanning filter, band width 30 KHz) was carried out to measure initial reflectivity and C/N. The same recording medium was irradiated with tungsten light of 54,000 lux for 50 hours, and reflectivity and C/N values were then measured. The results are shown in the following table 2.

EXAMPLE 8

A recording medium was prepared in the same manner as in Example 7, except that a solution containing a coloring matter having the following chemical formula and the above listed Compound 7 in a weight ratio of 100:30 in place of the coloring matter and Compound 1 mentioned in Example 7 was used.

The recording medium thus prepared was subjected to the same tests as in Example 7, and the results are shown in the following table.

EXAMPLE 9

A recording medium was prepared in the same manner as in Example 7, except that Compound 3 was used in place of Compound 1.

The recording medium thus prepared was subjected to the same tests as in Example 7, and the results are shown in the following table.

EXAMPLE 10

A recording medium was prepared in the same manner as in Example 7, except that a coloring matter having the following chemical formula and Compound 4 were used in place of the coloring matter and Compound 1 used in Example 7.

The recording medium thus prepared was subjected to the same tests as in Example 7, and the results are shown in the following table.

EXAMPLE 11

A recording medium was prepared by coating a 1,2-dichloroethane solution containing Compound 4 and polycarbonate in a weight ratio of 7:3 on a polymethylmethacrylate substrate to form an underlayer of a thickness of 0.2 um and further coating thereon a recording layer containing the cyanin coloring matter only mentioned in Example 10.

The recording medium thus prepared was subjected to the same tests as in Example 7, and the results are shown in the following table.

EXAMPLE 12

A recording medium was prepared by coating a methanol solution containing Compound 1 and polyamide resin in a weight ratio of 7:3 on the recording layer prepared in Example 7 to form a protective layer having a thickness of 1 μm.

The recording medium thus prepared was subjected to the same tests as in Example 7, and the results are shown in the following table.

EXAMPLE 13

A recording medium was prepared in the same manner as in Example 7, except that a coloring matter having the following chemical formula was used in place of the coloring matter used in Example 7.

The recording medium thus prepared was subjected to the same tests as in Example 7, and the results are shown in the following table.

EXAMPLE 14

A recording medium was prepared in the same manner as in Example 7, except that a coloring matter having the following chemical formula was used in place of the coloring matter used in Example 7.

The recording medium thus prepared was subjected to the same tests as in Example 7, and the results are shown in the following table.

COMPARATIVE EXAMPLE 1

A comparative recording medium was prepared in the same manner as in Example 7, except that a recording layer was prepared by using the coloring matter only mentioned in Example 7.

The recording medium thus prepared was subjected to the same tests as in Example 7, and the results are shown in the following table.

COMPARATIVE EXAMPLE 2

A comparative recording medium was prepared in the same manner as in Example 8, except that a recording layer was prepared by using the coloring matter only mentioned in Example 8.

The recording medium thus prepared was subjected to the same tests as in Example 7, and the results are shown in the following table.

COMPARATIVE EXAMPLE 3

A comparative recording medium was prepared in the same manner as in Example 10, except that a recording layer was prepared by using the coloring matter only mentioned in Example 10.

The recording medium thus prepared was subjected to the same tests as in Example 7, and the results are shown in the following table 2.

TABLE 2

| | Initial Properties | | | After Light Irradiation for 50 Hours | | |
|---|---|---|---|---|---|---|
| | Writing Power (mW) | Reflectivity (%) | C/N (dB) | Writing Power (mW) | Reflectivity (%) | C/N (dB) |
| Example | | | | | | |
| 7 | 2.4 | 28.2 | 58 | 2.4 | 25.4 | 55 |
| 8 | 2.8 | 22.5 | 55 | 2.8 | 17.6 | 51 |
| 9 | 2.4 | 27.9 | 58 | 2.4 | 25.0 | 54 |
| 10 | 2.4 | 28.6 | 58 | 2.4 | 26.1 | 56 |
| 11 | 3.0 | 25.6 | 55 | 3.0 | 22.1 | 49 |
| 12 | 4.5 | 28.1 | 49 | 4.5 | 22.2 | 44 |
| 13 | 2.6 | 27.2 | 54 | 2.8 | 24.4 | 51 |
| 14 | 2.6 | 25.5 | 53 | 2.8 | 22.8 | 50 |
| Comparative Example | | | | | | |
| 1 | 2.4 | 28.1 | 58 | 4.0 | 12.6 | 33 |
| 2 | 2.8 | 22.2 | 55 | unmeasureable | 8.9 | unmeasureable |
| 3 | 2.4 | 28.2 | 58 | 4.0 | 12.2 | 31 |

As mentioned above, the optical information recording medium of the present invention provides fully improved preservation stability, light stability and durability for recording and regenerating for many times.

What we claim is:

1. An optical information recording medium comprising a substrate and an organic thin film recording layer containing a polymethine colorant having a polymethine chain, in admixture with a compound selected from the group consisting of (1)

and (2)

wherein R represents hydrogen or lower alkyl; X represents an acid anion; and A represents wherein n is 1 or 2; all the aromatic rings being substituted or unsubstituted with a substituent selected from the group consisting of lower alkyl, lower alkoxy, halogen and hydroxyl, the amount of said colorant and said compound being in sufficient quantity amount to enable the medium to have information recorded in said layer upon irradiation of the medium with laser light.

2. The optical information recording medium according to claim 1, wherein said recording layer contains from 2 to 60% by weight, of said compound.

3. The optical information recording medium according to claim 1, further comprises an underlayer between said substrate and said recording layer.

4. The optical information recording medium according to claim 1, further comprises a protective layer overlying said recording layer.

5. The optical information recording medium according to claim 1, wherein said recording layer has a thickness of 100 Å to 5 μm.

6. The optical information recording medium according to claim 3, wherein said underlayer has a thickness of 0.1 to 30 μm.

7. The optical information recording medium according to claim 4, wherein said protective layer has a thickness more than 0.1 μm.

8. The optical information recording medium according to claim 1, wherein said polymethine colorant is a cyanine coloring matter.

9. The optical information recording medium according to claim 1, wherein said medium further contains at least one low molecular weight compound selected from the group consisting of plasticizer, surfactant, antistatic agent, slip additive, fire retardant, stabilizer, dispersing agent, antioxidant and light resistance improver.

10. The optical information recording medium according to claim 1, wherein said compound is selected from the group consisting of:

1

2

3

4

5

6

-continued

7

8

9

10

11

12

13

14

15

16

17

18

19

20

21

22

23

24

25

26

27

28

29

30

31

32

33

34

35

36

37

-continued

38

39

40

41

42

43

44

11. An optical information recording medium according to claim 1, in which said compound has the formula,

12. An optical information recording medium as claimed in claim 11 in which R is lower alkyl.

13. An optical information recording medium as claimed in claim 11 in which R is n-$C_3H_7$ and X is $SbF_6$.

14. An optical information recording medium according to claim 1 in which said compound has the formula

15. An optical information recording medium according to claim 1, in which said compound has the formula, 16. An optical information recording medium as claimed in claim 11 in which said organic thin film recording layer contains coloring matter selected from the group consisting of and -continued 17. An optical information recording medium as claimed in claim 13 in which said organic thin film recording layer contains coloring matter having the formula wherein $R_1$ and $R_2$ are alkyl, hydroxyalkyl, alkoxyalkyl, aralkyl, carboxyalkyl, carboxyalkylate bonded with an alkaline metal cation, sulphoalkyl or sulphonate alkyl bonded with alkaline metal cation or sulphoalkyl; $Z_1$ and $Z_2$ are 5 membered or 6 membered heterocyclic rings or atomic groups capable of composing a condensed ring comprising 5 membered or 6 membered heterocyclic rings; l is an integer of 1 to 4 and X is an acid anion.

18. The optical information recording medium according to claim 1, wherein said medium further contains at least one high molecular compound selected from the group consisting of ionomer resin, polyamide resin, vinyl resin, natural high molecular compound, silicone, liquid rubber and silane coupler.

* * * * *